(12) United States Patent
Hellwagner et al.

(10) Patent No.: US 7,844,638 B2
(45) Date of Patent: Nov. 30, 2010

(54) GENERIC DATA STREAM DESCRIPTION

(75) Inventors: Hermann Hellwagner, Klagenfurt (AT); Jörg Heuer, München (DE); Andreas Hutter, München (DE); Harald Kosch, Klagenfurt (AT); Christian Timmerer, Klagenfurt (AT)

(73) Assignee: Siemens Aktiengesellschaft, Munich (DE)

( * ) Notice: Subject to any disclaimer, the term of this patent is extended or adjusted under 35 U.S.C. 154(b) by 501 days.

(21) Appl. No.: 10/512,820

(22) PCT Filed: Apr. 23, 2003

(86) PCT No.: PCT/DE03/01322
§ 371 (c)(1),
(2), (4) Date: Jul. 18, 2005

(87) PCT Pub. No.: WO03/091905
PCT Pub. Date: Nov. 6, 2003

(65) Prior Publication Data
US 2005/0287948 A1  Dec. 29, 2005

(30) Foreign Application Priority Data
Apr. 26, 2002 (DE) ................. 102 18 812

(51) Int. Cl.
*G06F 17/30* (2006.01)
(52) U.S. Cl. .................................... 707/802
(58) Field of Classification Search ........... 707/1–10, 707/100–104.1, 200–206; 375/240.2, 240, 375/240.05, 240.13, 240.22, 240.23, 260; 709/235; 370/390, 486; 380/37; 386/96, 386/124; 341/51; 717/143
See application file for complete search history.

(56) References Cited

U.S. PATENT DOCUMENTS

| | | | |
|---|---|---|---|
| 6,167,092 A * | 12/2000 | Lengwehasatit | 375/240.2 |
| 6,490,320 B1 * | 12/2002 | Vetro et al. | 375/240.08 |
| 6,574,279 B1 * | 6/2003 | Vetro et al. | 375/240.23 |
| 7,336,890 B2 * | 2/2008 | Lu et al. | 386/96 |
| 2001/0047423 A1 * | 11/2001 | Shao et al. | 709/235 |
| 2002/0010798 A1 * | 1/2002 | Ben-Shaul et al. | 709/247 |
| 2004/0215665 A1 * | 10/2004 | Edgar et al. | 707/200 |
| 2005/0137832 A1 * | 6/2005 | Yemini et al. | 702/183 |
| 2005/0289168 A1 * | 12/2005 | Green et al. | 707/101 |

FOREIGN PATENT DOCUMENTS

WO  WO 02/08948  1/2002

OTHER PUBLICATIONS

S. Devillers et al., Bitstream Syntax Description Based Adaption in Streaming and Constrained Environments, Jun. 2005, IEEE Transactions on Multimedia, vol. 7, No. 3, pp. 463-470.*

(Continued)

*Primary Examiner*—Diane Mizrahi
(74) *Attorney, Agent, or Firm*—King & Spalding L.L.P.

(57) ABSTRACT

The present invention relates to the description of a data stream having data stream subdomains, which can be referenced and classified, and a data stream syntax. According to the present invention, the data stream subdomains are referenced and classified by division into at least one respective class of a classification, whereby the classification is at least partially independent of the syntax of the data stream.

17 Claims, 3 Drawing Sheets

```
<?xml version="1.0" encoding="UTF-8"?>
<--Bitstream description for MPEG4 video file akiyo.mpg4-->
<Bitstream xmlns="mpeg4" xmlns:xsi="http://www.w3.org/2000/10/XMLSchema-instance"
           xsi:schemaLocation="mpeg4" MPEG4Bitstream.xsd">
    <Header>akiyo.mpg4#0-17</Header>
    <I_VOP>akiyo.mpg4#18-4658</I_VOP>
    <P_VOP>akiyo.mpg4#4659-4756</P_VOP>
    <B_VOP>akiyo.mpg4#4757-4772</B_VOP>
    <B_VOP>akiyo.mpg4#4773-4795</B_VOP>
    <P_VOP>akiyo.mpg4#4796-4973</P_VOP>
    <B_VOP>akiyo.mpg4#4974-5026</B_VOP>
    <B_VOP>akiyo.mpg4#5027-5065</B_VOP>
    <P_VOP>akiyo.mpg4#5066-5300</P_VOP>
    <B_VOP>akiyo.mpg4#5301-5366</B_VOP>
    <B_VOP>akiyo.mpg4#5367-5431</B_VOP>
    <P_VOP>akiyo.mpg4#5432-5705</P_VOP>
    <B_VOP>akiyo.mpg4#5706-5779</B_VOP>
    <B_VOP>akiyo.mpg4#5780-5847</B_VOP>
    <I_VOP>akiyo.mpg4#5848-10517</I_VOP>

<!-- and so on... -->

</Bitstream>
```

OTHER PUBLICATIONS

Davy De Schrijver et al., "Performance of a Scalable Bitstream Adapton Process Based on High Level XML Descriptions" (no date), Ghent University, Gehent, Belgium, pp. 1-4.*

Carrer et al., "An Annotation Engine for Supporting Video Database population", Multimedia Tools and Applications, Aug. 15, 1996 XP 002258039.

Hori et al., "Annotation based Web content transcoding", Computer Networks, Elsevier Science Publishers, vol. 33, No. 1-6, Jun. 2000, pp. 197-211.

McKelvie et al., "The MATE workbench An annotation tool for XML coded speech corpora", Speech Communication, Elsevier Science Publishers, vol. 33, No. 1-2, Jan. 2001, pp. 97-112.

W3C XML Schema, Tools, Usage, Resources and Specifications and Development pp. 1-3.

Sylvain Devillers; International Organisation for Standardisation Organisation Internationale De Normalisation ISO/IEC JTC1/SC29/WG11 Coding of Moving Pictures and Audio, Bitstream Syntax Definition Language pp. 1-15.

Sylvain Devillers: "XML and XSLT MOdeling for Multimedia Bitstream Manipulation" Poster Proceedings of the 10th International World Wide Web Conference, [online], May 1-4, 2001, Seiten 154-155. Hong Kong ISSN: Gefunden im internet: URL:http://www10.org/cdrom/posters/1112.pdf [gefunden am Oct. 15, 2008].

Amielh et al. "Multimedia Content Adaptation with XML" Eight International Conference on Multimedia Modeling (MMM2001), Paper Proceedings, Amsterdam, NL, Nov. 5-7, 2001 - XP009107237 (20 pages).

* cited by examiner

FIG 2

```xml
<?xml version="1.0" encoding="UTF-8"?>
<!--Bitstream description for MPEG4 video file akiyo.mpg4-->
<Bitstream xmlns="mpeg4" xmlns:xsi="http://www.w3.org/2000/10/XMLSchema-instance"
           xsi:schemaLocation="mpeg4 MPEG4Bitstream.xsd">
  <Header>akiyo.mpg4#0-17</Header>
  <I_VOP>akiyo.mpg4#18-4658</I_VOP>
  <P_VOP>akiyo.mpg4#4659-4756</P_VOP>
  <B_VOP>akiyo.mpg4#4757-4772</B_VOP>
  <B_VOP>akiyo.mpg4#4773-4795</B_VOP>
  <P_VOP>akiyo.mpg4#4796-4973</P_VOP>
  <B_VOP>akiyo.mpg4#4974-5026</B_VOP>
  <B_VOP>akiyo.mpg4#5027-5065</B_VOP>
  <P_VOP>akiyo.mpg4#5066-5300</P_VOP>
  <B_VOP>akiyo.mpg4#5301-5366</B_VOP>
  <B_VOP>akiyo.mpg4#5367-5431</B_VOP>
  <P_VOP>akiyo.mpg4#5432-5705</P_VOP>
  <B_VOP>akiyo.mpg4#5706-5779</B_VOP>
  <B_VOP>akiyo.mpg4#5780-5847</B_VOP>
  <I_VOP>akiyo.mpg4#5848-10517</I_VOP>

<!-- and so on... -->

</Bitstream>
```

FIG 3

```xml
<?xml version="1.0" encoding="UTF-8"?>
<!--Sample XML file generated by XML Spy v4.3 U (http://www.xmlspy.com)-->
<gBSD xmlns="g-BSDL" xmlns:mpeg7="urn:mpeg:mpeg7:schema:2001" xmlns:xsi="http://www.w3.org/2001/XMLSchema-instance" xsi:schemaLocation="g-BSDL C:\data\Faifax\prepare\g-BSDL_JH5xsd.xsd">
  <Header>
    <ClassificationAlias alias="M4V" href="urn:mpeg:mpeg4:video:cs:syntacticalLabels"/>
    <DefaultUnit>byt</DefaultUnit>
    <DefaultAddressMode>Absolute/Length</DefaultAddressMode>
    <DefaultGlobalAddress>akiyo.mp4</DefaultGlobalAddress>
  </Header>
  <gBSDUnit marker="F" start="0" length="37534" >
    <gBSDUnit marker="A" syntacticalLabel="Header" start="0" length="17"/>
    <gBSDUnit marker="A" syntacticalLabel=":M4V:I_VOP" start="18" length="4641"/>
    <gBSDUnit marker="A B" syntacticalLabel=":M4V:P_VOP" start="4659" length="97"/>
    <gBSDUnit marker="A B C" syntacticalLabel=":M4V:B_VOP" start="4757" length="15"/>
    <gBSDUnit marker="A B C" syntacticalLabel=":M4V:B_VOP" start="4773" length="22"/>
    <!-- ...and so on... -->
  </gBSDUnit>
  <gBSDUnit marker="E" globalAddress="akiyo.mp4" start="37535" length="53696" >
    <gBSDUnit marker="A" syntacticalLabel="Header" start="37535" length="32"/>
    <gBSDUnit marker="A" syntacticalLabel=":M4V:I_VOP" start="37567" length="4641"/>
    <gBSDUnit marker="A B" syntacticalLabel=":M4V:P_VOP" start="4659" length="97"/>
    <gBSDUnit marker="A B C" syntacticalLabel=":M4V:B_VOP" start="4757" length="15"/>
    <gBSDUnit marker="A B C" syntacticalLabel=":M4V:B_VOP" start="4773" length="22"/>
    <!-- ...and so on... -->
  </gBSDUnit>
  <!-- ...and so on... -->
</gBSDL>
```

_US 7,844,638 B2_

GENERIC DATA STREAM DESCRIPTION

CROSS-REFERENCE TO RELATED APPLICATIONS

This application is a U.S. national stage application of International Application No. PCT/DE03/01322 filed Apr. 23, 2003, which designates the United States of America, and claims priority to German application number 102 18 812.2 filed Apr. 26, 2002, the contents of which are hereby incorporated by reference in their entirety.

BACKGROUND OF THE INVENTION

In Devillers S.: "Bitstream Syntax Definition Language: An Input to MPEG-21 Content Representation," there is a description of a method via which adaptation operations can be performed for given media streams on the basis of a language called BSDL (Bitstream Syntax Description Language) for the description of data streams. For this purpose transformation descriptions are used which can be written, for example, in the language XSL (Extensible Stylesheet Language). XSL transformations are explained in "XSL Transformations (XSLT)" Version 1.0, W3C Recommendation published Nov. 16, 1999. The transformation descriptions are used in order to transform an XML document conforming to a media stream-specific BSDL embodiment (i.e., a schema conforming to the "XML Schema Language" W3C Recommendation published May 2, 2001), or corresponding to a DTD (Document Type Definition), into an adapted XML document. Such document is then used, in turn, to generate a transformed data stream from a first data stream with the aid of the BSDL embodiment.

This process is explained in greater detail with reference to FIG. 1. A first data stream a_1 in the form of a binary bitstream is forwarded to a first bitstream parser BP_1. Using a BSDL schema BSDL_a, the bitstream parser BP_1 generates, from the first data stream a_1, a first data stream description BSD_1/1 for the first data stream in the form of an XML document. Using an XSLT style sheet XSL, an XSL processor XSLP then generates from the first data stream description BSD_1/1 for the first data stream a second data stream description BSD_1/2 for the first data stream. Finally, a second bitstream parser BP_2 transforms the first data stream a_1 using the BSDL schema BSDL_a and the second data stream description BSD_1/2 for the first data stream into the second data stream a_2.

This method can be used, for example, to adapt an instance of a media stream residing on a media server, such as a video stream, to the requirements of a requesting client such that, after the adaptation, the image format of the video stream, for example, corresponds to the screen resolution present on the terminal device or, for example, the preferred bit rate on the transmission path from the server to the client is used to optimal effect.

An example of a part of a first data stream description BSD_1/1 in the form of an extract from an XML document is shown in FIG. 2. In this example the data stream is described by the element "Bitstream". The "Bitstream" element contains further elements which are specific to the described bitstream. Thus, an MPEG 4 bitstream is described in this example. The "Bitstream" element, therefore, contains further elements such as "I_VOP," "P_VOP" or "B_VOP." The contents of these bitstream-specific elements include a character string such as, for example, "akiyo.mpg4#18-4658," which represents a reference to a bitstream. To that end, the character string is composed of a reference to the data stream (character string preceding the separator "#," (for example, akiyo.mpg4) and a reference to the data stream subdomain classified by the element in the form of a start and end address in the data stream (e.g., 18 and 4658).

The data stream description presented has disadvantages, however. Thus, it is not possible, within the description BSDL_1/1, to add a further marking to the elements in addition to their name; for example, with regard to their importance for the overall presentation of the media stream.

The invention is, therefore, directed toward a new, improved description language for data streams which avoids the disadvantages described.

SUMMARY OF THE INVENTION

The idea on which the present invention is based is to be able to use the elements of the description language free of the restrictions which arise as a result of the fact that the classification of the data stream subdomains is performed solely according to information that is produced from the data stream and, thereby, become independent of the syntax predetermined by the format, the content or the meaning of the data stream.

Accordingly, a data stream contains data stream subdomains which can be referenced and classified. It also has a data stream syntax which is given by the format and/or the content of the data stream. At least some data stream subdomains are referenced. That is to say, they are provided with a reference which makes them uniquely identifiable. The most outstanding example of a reference of this kind is the description of the position of a data stream subdomain in the data stream via address data. Moreover, the data stream subdomains are classified by assignment to at least one class of a classification. By being classified into a class, they are assigned an attribute predetermined by the class and characteristic for them. The classification is at least partially independent of the syntax of the data stream, with the result that the classification is independent of the syntactical meaning of the data stream subdomains within the data stream. In other words, it does not follow the structure and syntax of the data stream to be described, but contains classes which are independent of the structure, particularly of the coding format, of the data stream and are not related to it in terms of content.

In this case, the meaning of the classes does not have to emerge exclusively from the data stream description. Quite the contrary, it is an advantage of the inventive method that via such descriptions it is even possible to perform transformations of data streams without the meaning of the classes being known. Alternatively or in addition, provision can be made for the meaning of individual classes to be drawn from a source outside of the data stream.

Preferably, the classification is carried out in that markers are assigned to the data stream subdomains, with each marker being assigned to the individual classes. Thus, for example, an element of the data stream description which references and classifies a data stream subdomain contains, in addition to the reference, which is embodied as an address specification, for example, the class in the form of the marker, to which a value is assigned which defines the class.

At least one of the data stream subdomains is subdivided into a number of classes, for which purpose it is assigned, in particular, a number of markers. Thus, the data stream subdomains can be assigned a number of attributes which are determined by the class affiliations.

It is furthermore advantageous to subdivide at least one of the classes into subclasses and to assign one of these subclasses to at least one of the data stream subdomains. In this way, cascading tree structures corresponding to the aims of the respective applications can be built up.

At least one of the data stream subdomains can be described in the description subdivided into data stream sub-subdomains which are classified in their turn. In this way, a tree structure also can be generated at the level of the data stream subdomains.

With regard to the rules for the description of the data stream, even if one wishes to free oneself from the associated data stream syntax, one can nevertheless include information about the respective data stream syntax of the data stream subdomains in the description if this information is still, in fact, to be used later. In this way, the flexibility of the method is linked to the information content of the method described at the beginning. The information can be included, for example, such that the element of the data stream description describing one data stream subdomain in each case has, in addition to an element and/or attribute for the referencing and an element and/or attribute for the classification, independently of the data stream syntax, another element and/or attribute which is dependent on the data stream syntax, while its value specifies the syntactical classification of the data stream subdomains in the data stream.

It is furthermore advantageous if at least one of the data stream subdomains is assigned a value which corresponds to the value represented by the data stream subdomain in the data stream.

The referencing of at least one of the data stream subdomains can, as already described, include at least one address specification indicating the position of the data stream subdomains in the data stream.

Alternatively or in addition, the referencing of at least one of the data stream subdomains can include the specification that the data stream subdomain joins onto the end of the preceding data stream subdomain.

Alternatively or in addition, the referencing of at least one of the data stream subdomains can include specifications indicating the length of the data stream subdomain.

The description of the data stream is preferably written in XML (Extensible Markup Language), for which purpose an XML document is generated or is present.

In XML, each data stream subdomain can be described by an element. In addition, it can be described further by further elements which describe its data stream subdomains.

The individual data stream subdomains can be referenced by elements and/or attributes to which a value is assigned for referencing purposes.

The data stream subdomains also can be classified by elements and/or attributes to which a value is assigned for classification purposes.

In the interests of a unique classification, a class should correspond to each value.

The data stream is preferably a data record, bit, media, audio, image and/or video stream. Its description then can be used to reduce its resolution, to rearrange the sequence of its data stream subdomains, to filter out violent content or to adapt the data stream in some other way to specific needs.

The data stream is coded, in particular, in the MPEG-4, MPEG-2, MPEG-1 or JPEG2000 standard.

A data stream description for describing a data stream which can be produced according to one of the previously described methods can be used quite effectively in a method for transforming a first data stream into a second data stream. In this case, the first data stream contains data stream subdomains which can be referenced and/or classified. The second data stream also contains data stream subdomains which can be referenced and/or classified. There is then provided a data stream description for the first data stream, in which description at least some, preferably almost all, of the data stream subdomains in the first data stream are referenced and/or classified. The first data stream is transformed into the second data stream via a data stream transformation. In this case, such as with the methods described in the prior art, contents can be filtered out, an image resolution reduced and/or the sequence of the data in the data stream reordered. A first data stream description is generated for the second data stream, in which description at least some, preferably almost all, of the data stream subdomains in the second data stream are referenced and/or classified.

A device which is set up to execute a method of the above-described kind can be implemented, for example, such that for each of the aforementioned method steps there are provided suitable parts which perform the method steps. Advantageous embodiments of the device are derived analogously to the advantageous embodiments of the method.

A program product for a data processing system that contains software code sections via which one of the described methods can be executed on the data processing system can be achieved by suitable implementation of the method in a programming language and its compilation into code which can be executed by the data processing system. The sections of software code are stored for this purpose. A program product is understood here to refer to a program as a marketable product. It can be present in any form, for example, on paper or on a computer-readable data medium, or it can be distributed via a network.

Additional features and advantages of the present invention are described in, and will be apparent from, the following Detailed Description of the Invention and the Figures.

BRIEF DESCRIPTION OF THE FIGURES

FIG. 2 shows an example of a part of a first data stream description in the form of an extract from an XML document.

FIG. 3 shows an extract from a description for a data stream.

DETAILED DESCRIPTION OF THE INVENTION

Figure 1:
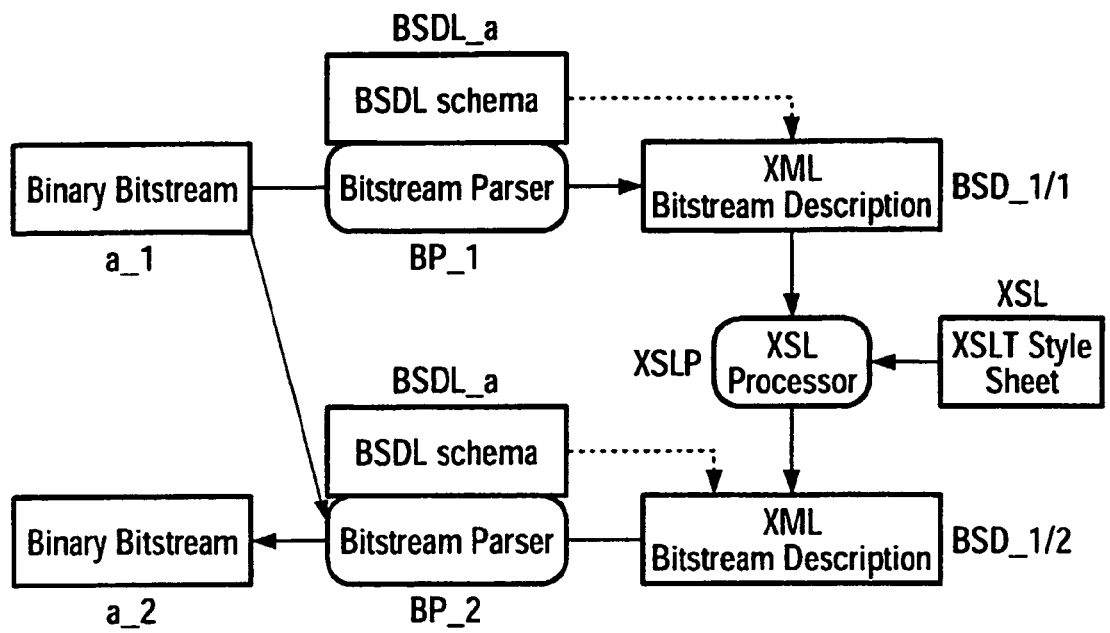
FIG. 1 shows a process for description of a method via which adaptation operations can be performed for given media streams on the basis of a language called BSDL.

Initially, generally possible embodiments of a method for describing a data stream will be described.

The structure of the data stream description, that is to say the structure specification BSDL, is at least partially generic, in other words independent of special coding formats, particularly independent of the coding format of the data stream described. Nonetheless, a typing of the elements with regard to specific coding formats is made possible.

Toward that end, a data stream subdomain $a\_1\,[x]$ of the data stream $a\_1$ is assigned a marker $ms\_1\,[x]$ which specifies the meaning of the data stream subdomain $a\_1\,[x]$ for the data stream $a\_1$. Such marker $ms\_1\,[x]$ does not have to be generic, but can be bitstream-specific; for example, a VOP in an MPEG-4 video stream can be identified. This can be used to support methods for the transformation of data streams described in the introduction. This results in the advantage that the description of the data stream, particularly the classification, is generic and only the values of the markers $ms\_1\,[x]$ can vary; for example, based on a classification schema.

Thus, language can be parsed independently of the type of the bitstream a_1 via a bitstream-independent processor.

The description of the data stream can have the following special attributes in this case:

The data stream description assigns one or more markers m1[i] to the data stream subdomains a_1 [x] in the data stream a_1. The markers m_1 [i] are used to translate the statements of the transformation descriptions XSL onto the data stream. An interpretation of the meaning of a marker m_1 [i] and/or of the data stream subdomains a_1 [x] for the data stream a_1 is not necessary in this case and not necessarily present.

The same marker m_1 [i] can be used for a number of data stream subdomains (e.g., a_1 [x] and a_1 [y]) if, for example, the different data stream subdomains a_1 [x] and a_1 [y] belong to a semantic unit in the data stream a_1 or, for example, including syntactical elements of the same type.

A data stream subdomain a_1 [x] identified by the marker m_1 [i] may contain data stream sub-subdomains a_1 [z] which, in turn, are identified by markers m_1 [j]. This is advantageous, for example, with regard to the execution speed of the transformation when transformations can be performed via different transformation descriptions XSL with different granularity. In one possible embodiment, these data stream subdomains a_1 [z] can be marked recursively starting from the identification of the data stream subdomain a_1 [x].

A data stream subdomain a_1 [x] can be assigned a value v[x] which corresponds, for example, to the value represented by a_1 [x] in the bitstream. This value can be changed during a transformation; e.g., using XSLT.

The referencing in the form of an addressing of the data stream subdomains a_1 [x] can be implemented in one embodiment in one of the following ways:

specification of the start and/or end of the data stream subdomain a_1 [x] by counting units from the start of the data stream.

specification of the start and/or end of the data stream subdomain a_1 [x] by counting units from the start of the preceding data stream subdomain a_1 [w].

specification of the start and/or end of the data stream subdomain a_1 [x] by counting units from the end of the preceding data stream subdomain a_1 [w].

specification of the start and/or end of the data stream subdomain a_1 [x] by counting units from the start of the data stream subdomain a_1 [a] which contains the data stream subdomain a_1 [x].

specification of the end of the data stream subdomain a_1 [x] by counting units from the start of the data stream subdomain a_1 [x].

Without explicit specification of the start of the data stream subdomain a_1 [x] it can be specified that the start of the data stream subdomain a_1 [x] joins onto the end of the preceding data stream subdomain a_1 [w] or corresponds to the start of the data stream subdomain a_1 [a] if the data stream subdomain a_1 [x] is the first subdomain contained in the data stream subdomain a_1 [a].

These values can be specified by counting units. In this case, one or more units, such as bits or bytes, can be used.

Not all the aforementioned attributes must be present in a description. Instead, the structure elements which model these attributes also can be used independently of one another.

An extract of an exemplary embodiment of a description of a data stream in XML is shown in FIG. 3.

In this example, the element "gBSD" describes an MPEG-4 bitstream. In contrast to the example according to the prior art explained in the background, the (description) elements (in this case, for example, the "gBSDUnit" and the "Header" element) which are contained in the element "gBSDm" are generic and independent of the described data stream.

An element "gBSDUnit" describes a data domain which is referenced by the values in the attributes "start" and "length" and which can be used for the adaptation of the data stream as a unit. In this example, the elements "gBSDUnit" can be classified with a value in the attribute "marker." Depending on this classification, individual domains in the data stream can be identified and adaption statements executed on these domains. An important aspect in this case is that the meaning of the classification is currently not contained in the description.

In contrast to this, a data domain which is identified by an element "gBSDUnit" is classified and a meaning assigned via the value in the attribute "syntacticalLabel." In the example, the meaning is, for example, that a data domain represents a B_VOP (syntacticalLabel=":M4V:B_VOP") in the MPEG-4 video (see alias ":M4V:" or "urn:mpeg:mpeg4:video:cs:syntacticalLabels") data stream.

The referenced data domains and, consequently, the elements "gBSDUnit" can be nested in one another, as shown, for example, by the elements with the marker E and those with the marker A.

Figure 4:
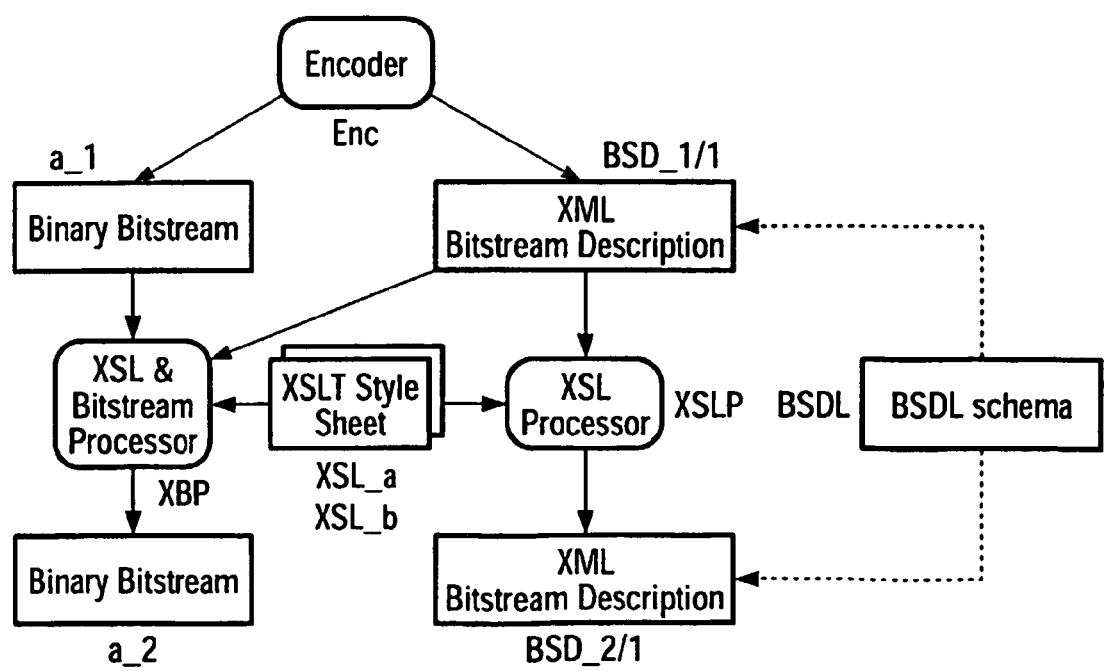
FIG. 4 shows a method for transforming a first data stream into a second data stream, wherein a description for a data stream is used.

With reference to FIG. 4, a transformation is described in which descriptions BSD of data streams are used and also even transformed. FIG. 4 shows an encoder Enc which supplies a first data stream a_1 and a first data stream description BSD_1/1 for the first data stream.

The first data stream description BSD_1/1 for the first data stream which describes the first data stream a_1 and is compliant with regard to a structure specification BSDL is used twice: Firstly, the first data stream description BSD_1/1 for the first data stream is used together with a data stream transformation description XSL_a in order to transform the first data stream a_1 in the form of a media stream into a second data stream a_2 in the form of a media stream.

Next, the first data stream description BSD_1/1 itself is transformed under the control of a data stream description transformation description XSL_b into a first data stream description BSD_2/1 for the second data stream. The data stream description transformation description XSL_b can be embodied here in such a way that the data stream addresses in the first data stream description BSD_2/1 for the second data stream are correct in relation to the second data stream a_2. In this way, a further transformation which correspondingly contains further transformation descriptions in the form of data stream transformation descriptions and data stream description transformation descriptions can be performed again directly and according to exactly the same procedure without additional intermediate processing steps. Thus, a direct cascading of transformations is possible in a uniform way. The structure specification for the BSDL schemas corresponds to the outlined descriptions of data streams.

The data stream transformation description XSL_a and the data stream description transformation description XSL_b can be generated in advance or, alternatively, generated automatically by a processing unit which, for example, takes into account additional transmitted information about the requesting terminal device in a client-server scenario.

If the first data stream description BSDL_1/1 for the first data stream is not provided immediately by the encoder Enc at the time of generation of the first data stream a_1, it can be generated according to the method in the prior art via a parser from the first data stream a_1.

In the presented exemplary embodiment, the generation of second data stream descriptions for the first and/or second data stream is dispensed with entirely.

The data stream transformation of the first data stream a_1 into the second data stream a_2 using the first data stream description BSD_1/1 for the first data stream and the data stream transformation description XSL_a is performed in an XSL and data stream processor XBP.

The data stream description transformation of the first data stream description BSD_1/1 for the first data stream into the first data stream description BSD2/1 for the second data stream is performed, particularly parallel thereto, in an XSL processor XSLP.

Data stream transformation and data stream description transformation also can be combined in one process.

Moreover, the data stream transformation description XSL_a and the data stream description transformation description XSL_b can be combined in one document.

Although the present invention has been described with reference to specific embodiments, those of skill in the art will recognize that changes may be made thereto without departing from the spirit and scope of the present invention as set forth in the hereafter appended claims.

The invention claimed is:

1. A computer-readable storage medium storing computer program instructions, which when executed on a programmable processor perform a method to structure a data stream, wherein the data stream comprises a data stream syntax and data stream subdomains which are referenced and classified, the method comprising:
   referencing at least some of the data stream subdomains;
   classifying the data stream subdomains via a respective classification into at least one class of a classification; and
   structuring the data stream, wherein the data stream classification contains at least one class of the data stream that is independent of the structure of the data stream and is not related to the data stream in terms of content;
   wherein the referencing of at least one of the data stream subdomains includes specifying that the data stream subdomain joins onto an end of a preceding data stream subdomain;
   wherein the referencing and classifying are at least part of a data stream description; and
   wherein a meaning of the classification does not emerge from the data stream description.

2. A method for structuring a data stream as claimed in claim 1, wherein the classification is made by assignment of markers to the data stream subdomains which are respectively assigned to the individual classes.

3. A method for structuring a data stream as claimed in claim 1, wherein at least one of the data stream subdomains is subdivided into a plurality of classes.

4. A method for structuring a data stream as claimed in claim 1, wherein at least one of the data stream subdomains is assigned multiple markers.

5. A method for structuring a data stream as claimed in claim 1, wherein at least one of the classes is subdivided into subclasses and at least one of the data stream subdomains is assigned to one of the subclasses.

6. A method for structuring a data stream as claimed in claim 1, wherein at least one of the data stream subdomains is subdivided into data stream sub-subdomains which are classified in turn.

7. A method for structuring a data stream as claimed in claim 1, wherein the data stream subdomains are assigned information about respective data stream syntax.

8. A method for structuring a data stream as claimed in claim 1, wherein at least one of the data stream subdomains is assigned a value which corresponds to a value represented by the respective data stream subdomain in the data stream.

9. A method for structuring a data stream as claimed in claim 1, wherein the referencing of at least one of the data stream subdomains includes at least one address specification concerning a position of the data stream subdomain in the data stream.

10. A method for structuring a data stream as claimed in claim 1, wherein the referencing of at least one of the data stream subdomains includes a length of the respective data stream subdomain.

11. A method for structuring a data stream as claimed in claim 1, wherein the referencing and classifying of the data stream is written in XML.

12. A method for structuring a data stream as claimed in claim 11, wherein the data stream subdomains are described via elements.

13. A method for structuring a data stream as claimed in claim 11, wherein the data stream subdomains are referenced via at least one of attributes and elements to which a value is assigned for referencing purposes.

14. A method for structuring a data stream as claimed in claim 11, wherein the data stream subdomains are classified via at least one of attributes and elements to which a value is assigned for classification purposes.

15. A method for structuring a data stream as claimed in claim 1, wherein the data stream is at least one of a data record, bit, media, audio, image and video stream.

16. A method for structuring a data stream having data stream subdomains and a data stream syntax, wherein the method is performed by a programmable processor executing computer instructions stored in a computer-readable storage medium, and comprises the steps of:
   providing an identifying reference to at least some of the data stream subdomains;
   forming a classification for a data stream subdomain, wherein the classification includes at least one class; and
   structuring the data stream using the identifying reference and classification, wherein the data stream classification contains at least one class of the data stream that is independent of the structure of the data stream and is not related to the data stream in terms of content; and
   processing the data stream structure during at least one of an adaptation of the data stream and a transformation of the data stream;
   wherein the identifying reference for at least one of the data stream subdomains specifies that the data stream subdomain joins onto an end of a preceding data stream subdomain;
   wherein the identifying reference and the classification are at least part of a data stream description; and
   wherein a meaning of the classification does not emerge from the data stream description.

17. A device including a programmable processor that executes computer instructions stored in a computer-readable storage medium to perform a method of structuring a data stream having data stream subdomains that are referenced and classified, and having a data stream syntax and data stream subdomains which are references and classified, the method comprising:

referencing at least some of the data stream subdomains;

classifying the data stream subdomains via a respective classification into at least one class of a classification; and structuring the data stream, wherein the data stream classification contains at least one class of the data stream that is independent of the structure of the data stream and is not related to the data stream in terms of content;

wherein the referencing of at least one of the data stream subdomains includes specifying that the data stream subdomain joins onto an end of a preceding data stream subdomain;

wherein the referencing and classifying are at least part of a data stream description; and wherein a meaning of the classification does not emerge from the data stream description.

* * * * *